US012795084B2

(12) United States Patent
Yu et al.

(10) Patent No.: US 12,795,084 B2
(45) **Date of Patent: *Nov. 10, 2026**

(54) CODING WEIGHTED ANGULAR PREDICTION FOR INTRA CODING

(71) Applicant: ARRIS Enterprises LLC, Horsham, PA (US)

(72) Inventors: Yue Yu, San Diego, CA (US); Krit Panusopone, San Diego, CA (US); Limin Wang, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,272

(22) Filed: Mar. 18, 2025

(65) Prior Publication Data

US 2025/0220164 A1 Jul. 3, 2025

Related U.S. Application Data

(63) Continuation of application No. 18/116,210, filed on Mar. 1, 2023, now Pat. No. 12,278,953, which is a
(Continued)

(51) Int. Cl.
*H04N 19/107* (2014.01)
*H04N 19/105* (2014.01)
(Continued)

(52) U.S. Cl.
CPC ......... *H04N 19/107* (2014.11); *H04N 19/105* (2014.11); *H04N 19/11* (2014.11);
(Continued)

(58) Field of Classification Search
CPC .................................................... H04N 19/107
(Continued)

(56) References Cited

U.S. PATENT DOCUMENTS

2011/0249741 A1* 10/2011 Zhao .................... H04N 19/176
375/E7.243
2014/0072041 A1 3/2014 Seregin
(Continued)

FOREIGN PATENT DOCUMENTS

EP 2890130 A1 7/2015
WO 2012035640 A1 3/2012
(Continued)

OTHER PUBLICATIONS

Y.J. Chang, et al., "Arbitrary reference tier for Intra directional modes", Joint Video Exploration Team (JVET) of ITU-T SG16 WP3 and ISO/IET JTC 1/SC 29/WG11, JVET C0043, 3rd Meeting, May 26-Jun. 1, 2016, 3 pgs.
(Continued)

*Primary Examiner* — Yulin Sun
(74) *Attorney, Agent, or Firm* — Chernoff, Vilhauer, McClung & Stenzel, LLP

(57) ABSTRACT

A method and apparatus for decoding JVET video, including receiving a bitstream, and parsing said bitstream to identify a syntax element indicating an intra direction mode to use for generating at least one predictor. The intra direction mode is a first intra direction mode in a plurality of intra direction modes that includes at least one weighted intra direction mode that corresponds to a non-weighted intra direction mode. The syntax element may identify whether to use a non-weighted or weighted intra direction mode to generate the at least one predictor. Thus, the coding unit may be coded in accordance with the at least one generated predictor associated with the selected intra direction mode.

3 Claims, 13 Drawing Sheets

Related U.S. Application Data continuation of application No. 17/165,719, filed on Feb. 2, 2021, now Pat. No. 11,627,312, which is a continuation of application No. 15/605,901, filed on May 25, 2017, now Pat. No. 10,944,963.

(60) Provisional application No. 62/481,285, filed on Apr. 4, 2017, provisional application No. 62/481,671, filed on Apr. 4, 2017, provisional application No. 62/341,210, filed on May 25, 2016.

(51) Int. Cl.

| | |
|---|---|
| ***H04N 19/11*** | (2014.01) |
| ***H04N 19/176*** | (2014.01) |
| ***H04N 19/42*** | (2014.01) |
| ***H04N 19/593*** | (2014.01) |
| ***H04N 19/70*** | (2014.01) |
| ***H04N 21/2343*** | (2011.01) |
| ***H04N 21/2383*** | (2011.01) |
| *G06F 16/40* | (2019.01) |

(52) U.S. Cl.

CPC ........... *H04N 19/176* (2014.11); *H04N 19/42* (2014.11); *H04N 19/593* (2014.11); *H04N 19/70* (2014.11); *H04N 21/234363* (2013.01); *H04N 21/2383* (2013.01); *G06F 16/40* (2019.01); *H04N 21/234381* (2013.01)

(58) Field of Classification Search

USPC ..................................................... 375/240.15

See application file for complete search history.

(56) References Cited

U.S. PATENT DOCUMENTS

| | | | | |
|---|---|---|---|---|
| 2015/0172717 A1 | 6/2015 | Zhao et al. | | |
| 2016/0316200 A1 | 10/2016 | Zhang et al. | | |
| 2017/0272759 A1 | 9/2017 | Seregin | | |
| 2018/0184082 A1* | 6/2018 | Yoo | ...................... | H04N 19/159 |
| 2018/0288446 A1* | 10/2018 | An | ...................... | H04N 19/159 |

FOREIGN PATENT DOCUMENTS

| | | |
|---|---|---|
| WO | 2017205701 A1 | 11/2017 |
| WO | 2017205703 A1 | 11/2017 |

OTHER PUBLICATIONS

K. Suehring and X. Li, "JVET common test conditions and software reference configurations," JVET 2nd meeting, Joint Video Exploration Team (JVET) of ITU-T SG16/WP3 and ISO/IEC JTC1/SC29/WG11, JVET-B1010, Feb. 2016.

K. Panusopone, et al., "Weighted Angular Prediction", 6th Meeting, Joint Video Exploration Team (JVET) of ITU-T SG16/WP3 and ISO/IEC JTC1/SC29/WG11, JVET-F0104, Mar. 3-Apr. 7, 2017.

J. Chen, et al., "Algorithm Description of Joint Exploration Test Model 5," JVET-E1001, Jan. 2017.

J. Chen, et al., "Algorithm Description of Joint Exploration Test Model 4", 4th Meeting, Joint Video Exploration Team (JVET) of ITU-T SG16/WP3 and ISO/IEC JTC1/SC29/WG11, JVET-D1001-v3, Oct. 15-21, 2016.

PCT International Search Report & Written Opinion, RE: Application No. PCT/US2017/034594, dated Aug. 16, 2017.

K. Panusopone, et al., "Comparisons between UWP, W66 and Planar, Angular mode 66 under the same coding conditions", Joint Video Exploration Team (JVET) of ITU-T SG 16 WP 3 and ISO/IEC JTC 1/SC 29/WG 11, 7th Meeting: Torino, IT Jul. 13-21, 2017.

PCT International Search Report & Written Opinion, RE: Application No. PCT/US2018/040862, dated Sep. 24, 2018.

Y. Lin, et al., JCTVC-F509: CE6.a: Report of Bidirectional UDI mode for Intra prediction, Hisilicon Technologies, Ltd., V2, Jul. 14, 2011, 8 pgs.

Y. Ye, et al., "Improved h.264 intra coding based on bi-directional intra prediction, directional transform, and adaptive coefficient scanning", 15th IEEE International Conference on Image Processing, Oct. 12, 2008, pp. 2116-2119.

PCT International Search Report & Written Opinion, RE: Application No. PCT/US2017/068682, dated Mar. 16, 2018.

S. Yu, et al., "Distance-based weighted prediction for H.264 intra coding", Audio, Language and Image Processing, Jul. 7, 2008, pp. 1477-1480.

S. Matsuo, et al., "AHG7: Modification of Intra Angular Prediction Blending", 12th JCT-VC Meeting, 103rd MPEG Meeting, (Joint Video Collaboration Team on Video Coding of ISO/IEC JTC1/SC29/WG11 and ITU-T SG. 16), No. JCTVC-L0128, Jan. 7, 2013.

PCT International Search Report & Written Opinion, RE: Application No. PCT/US2017/034592, dated Aug. 16, 2017.

T. Shiodera, et al., "CE6 Subset A: Bidirectional Intra Prediction (JCTVC-C079)", 95th MPEG Meeting (Motion Picture Expert Group or ISO/IEC JTC1/SC29/WG11), No. M18859, Jan. 20, 2011.

K. Panusopone, et al., "Unequal Weight Planar Prediction and Constrained PDPC", 5th JVET Meeting (Joint Video Exploration Team of ISO/IEC JTC1/SC29/WG11 and ITU-T SG.16), No. JVET-E0068, Jan. 5, 2017.

* cited by examiner

S[n]= {
0, 0, 512, 341, 256, 205, 171, 146, 128, 114, 103, 93, 85, 79, 73, 68,
64, 60, 57, 54, 51, 49, 47, 45, 43, 41, 39, 38, 37, 35, 34, 33,
32, 31, 30, 29, 28, 28, 27, 26, 26, 25, 24, 24, 23, 23, 22, 22,
21, 21, 20, 20, 20, 19, 19, 19, 18, 18, 18, 17, 17, 17, 16, 16,
16, 16, 16, 15, 15, 15, 15, 14, 14, 14, 14, 14, 14, 13, 13, 13,
13, 13, 13, 12, 12, 12, 12, 12, 12, 11, 11, 11, 11, 11, 11, 11,
11, 11, 10, 10, 10, 10, 10, 10, 10, 10, 10, 10, 10, 9, 9, 9,
9, 9, 9, 9, 9, 9, 9, 9, 9, 8, 8, 8, 8, 8, 8, 8,
8, 8, 8, 8, 8, 8, 8, 8, 8, 7, 7, 7, 7, 7, 7, 7,
7, 7, 7, 7, 7, 7, 7, 7, 7, 7, 7, 7, 7, 7, 6, 6
6, 6, 6, 6, 6, 6, 6, 6, 6, 6, 6, 6, 6, 6, 6, 6,
6, 6, 6, 6, 6, 6, 6, 6, 6, 6, 5, 5, 5, 5 ,5 ,5,
5, 5, 5, 5, 5, 5, 5, 5, 5, 5, 5, 5, 5, 5, 5, 5,
5, 5, 5, 5, 5, 5, 5, 5, 5, 5, 5, 5, 5, 5, 5, 5,
5, 5, 5, 5, 5, 4 ,4 ,4 ,4 ,4 ,4 ,4 ,4 ,4 ,4 ,4,
5, 5, 5, 5, 5, 4, 4, 4, 4, 4, 4, 4, 4, 4, 4, 4,
4, 4, 4, 4, 4, 4, 4, 4, 4, 4, 4, 4, 4, 4, 4, 4
}

FIG. 9

$$S[n]=\left\{\begin{array}{c}
0, 0, 512, 341, 256, 205, 171, 146, 128, 114, 103, 93, 85, 79, 73, 68,\\
64, 60, 57, 54, 51, 49, 47, 45, 43, 41, 39, 38, 37, 35, 34, 33,\\
32, 31, 30, 29, 28, 28, 27, 26, 26, 25, 24, 24, 23, 23, 22, 22,\\
21, 21, 20, 20, 20, 19, 19, 19, 18, 18, 18, 17, 17, 17, 16, 16,\\
16, 16, 16, 15, 15, 15, 15, 14, 14, 14, 14, 14, 14, 13, 13, 13,\\
13, 13, 13, 12, 12, 12, 12, 12, 12, 11, 11, 11, 11, 11, 11, 11,\\
11, 11, 10, 10, 10, 10, 10, 10, 10, 10, 10, 10, 10, 9, 9, 9,\\
9, 9, 9, 9, 9, 9, 9, 9, 9, 8, 8, 8, 8, 8, 8, 8,\\
8, 8, 8, 8, 8, 8, 8, 8, 8, 7, 7, 7, 7, 7, 7, 7,\\
7, 7, 7, 7, 7, 7, 7, 7, 7, 7, 7, 7, 7, 7, 6, 6,\\
6, 6, 6, 6, 6, 6, 6, 6, 6, 6, 6, 6, 6, 6, 6, 6,\\
6, 6, 6, 6, 6, 6, 6, 6, 6, 6, 5, 5, 5, 5, 5, 5,\\
5, 5, 5, 5, 5, 5, 5, 5, 5, 5, 5, 5, 5, 5, 5, 5,\\
5, 5, 5, 5, 5, 5, 5, 5, 5, 5, 5, 5, 5, 5, 5, 5,\\
5, 5, 5, 5, 5, 4 ,4 ,4 ,4 ,4 ,4 ,4 ,4 ,4 ,4 ,4,\\
5, 5, 5, 5, 5, 4, 4, 4, 4, 4, 4, 4, 4, 4, 4, 4,\\
4, 4, 4, 4, 4, 4, 4, 4, 4, 4, 4, 4, 4, 4, 4, 4,\\
4, 4, 4, 4, 4, 4, 4, 4, 4, 4, 4, 4, 4, 4, 4, 4,\\
4, 4, 4, 4, 4, 4, 4, 4, 4, 4, 4, 4, 4, 4, 4, 4,\\
4, 4, 4, 4, 4, 4, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 3, 3, 3, 3, 3,\\
3, 3, 3, 3, 3, 3, 3, 3, 3, 3, 3, 2, 2, 2, 2, 2,\\
2, 2, 2, 2, 2, 2, 2, 2, 2, 2, 2, 2, 2, 2, 2, 2,\\
2, 2, 2, 2, 2, 2, 2, 2, 2, 2, 2, 2, 2, 2, 2, 2,\\
2, 2, 2, 2, 2, 2, 2, 2, 2, 2, 2, 2, 2, 2, 2, 2,\\
2, 2, 2, 2, 2, 2, 2, 2, 2, 2, 2, 2, 2, 2, 2, 2,\\
2, 2, 2, 2, 2, 2, 2, 2, 2, 2, 2, 2, 2, 2, 2, 2,\\
2, 2, 2, 2, 2, 2, 2, 2, 2, 2, 2, 2, 2, 2, 2, 2, 2
\end{array}\right\}$$

FIG. 10

CODING WEIGHTED ANGULAR PREDICTION FOR INTRA CODING

CLAIM OF PRIORITY

This application is a continuation of U.S. patent application Ser. No. 18/116,210 filed Mar. 1, 2023, which is a continuation of U.S. patent application Ser. No. 17/165,719 filed Feb. 2, 2021, now U.S. Pat. No. 11,627,312, which is a continuation of U.S. patent application Ser. No. 15/605,901, filed May 25, 2017, now U.S. Pat. No. 10,944,963, which claims priority under 35 U.S.C. § 119 (e) from earlier filed U.S. Provisional Patent Application No. 62/481,671, filed Apr. 4, 2017, from earlier filed U.S. Provisional Patent Application No. 62/481,285, filed Apr. 4, 2017, and from earlier filed U.S. Provisional Patent Application No. 62/341,210, filed May 25, 2016, all of which are hereby incorporated by reference.

TECHNICAL FIELD

The present disclosure relates to the field of video coding, particularly coded weighted angular prediction for intra coding in JVET.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

The present disclosure provides a method of partitioning a video coding block for JVET, the method comprising receiving a bitstream indicating how a coding tree unit was partitioned into coding units according to a partitioning structure that allows nodes to be split according to a partitioning technique, and parsing said bitstream to identify a syntax element indicating an intra direction mode to use for generating at least one predictor. The intra direction mode is a first intra direction mode in a plurality of intra direction modes that includes at least one weighted intra direction mode that corresponds to a non-weighted intra direction mode. The method further comprises identifying from the syntax element whether to use a non-weighted or weighted intra direction mode to generate the at least one predictor, generating the at least one predictor using the intra direction mode, and coding said coding unit in accordance with the at least one generated predictor associated with the selected intra direction mode.

The present disclosure also provides an apparatus for coding video data comprising one or more processors configured to perform the techniques disclosed herein.

BRIEF DESCRIPTION OF THE DRAWINGS

Further details of the present invention are explained with the help of the attached drawings in which:

FIG. 9 is an example of a weighted parameter table.

FIG. 10 illustrates another example a weighted parameter table.

DETAILED DESCRIPTION

Figure 1:
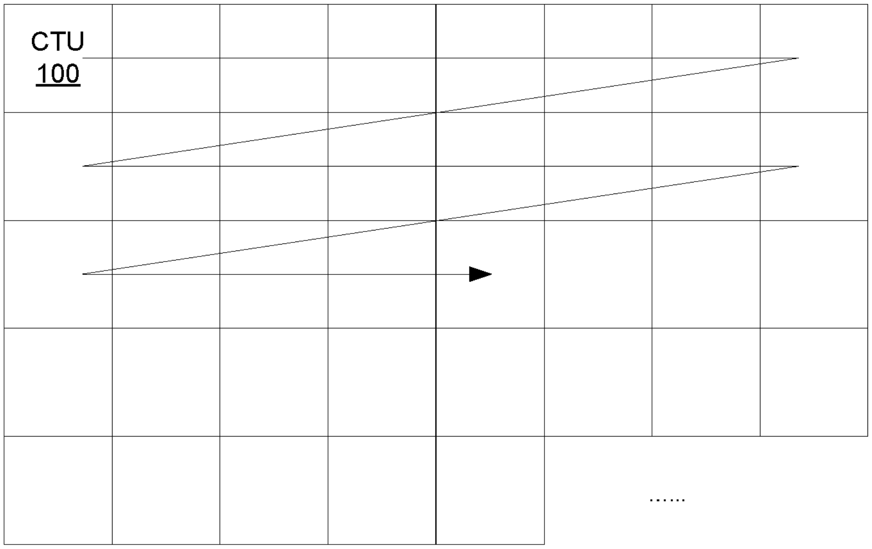
FIG. 1 depicts division of a frame into a plurality of Coding Tree Units (CTUs).

FIG. 1 depicts division of a frame into a plurality of Coding Tree Units (CTUs) 100. A frame can be an image in a video sequence, which may include a plurality of frames. A frame can include a matrix, or set of matrices, with pixel values representing intensity measures in the image. The pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence, or more specifically the coding tree units within each frame, can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2:
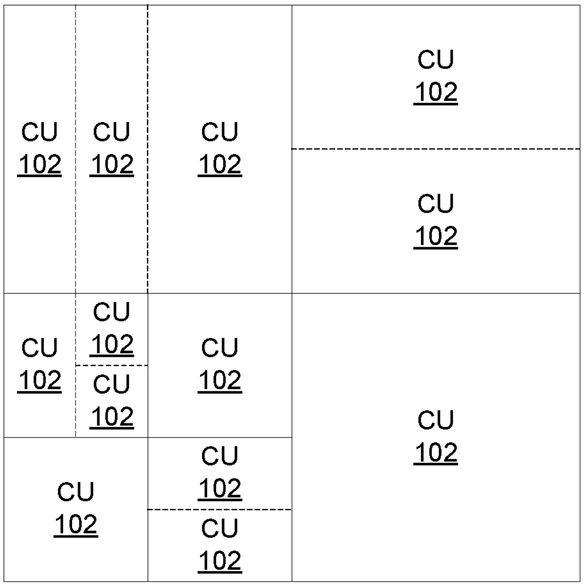
FIG. 2 depicts an exemplary partitioning of a CTU into Coding Units (CUs).

FIG. 2 depicts an exemplary partitioning of a CTU 100 into CUs 102, which are the basic units of prediction in coding. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be split into square blocks according to a quadtree, and those square blocks can then be split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs.

Figure 3:
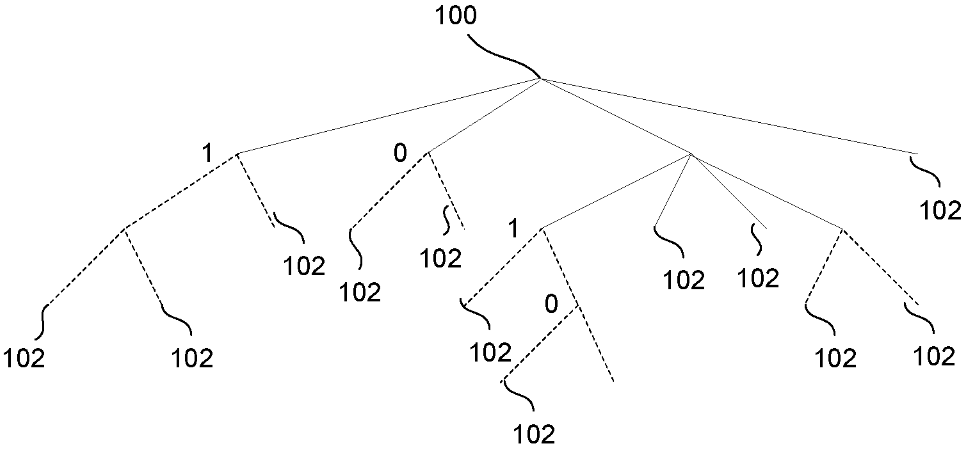
FIG. 3 depicts a quadtree plus binary tree (QTBT) representation of FIG. 2's CU partitioning.

FIG. 3 shows a QTBT representation of FIG. 2's partitioning. A quadtree root node represents the CTU 100, with each child node in the quadtree portion representing one of four square blocks split from a parent square block. The square blocks represented by the quadtree leaf nodes can then be divided symmetrically zero or more times using binary trees, with the quadtree leaf nodes being root nodes of the binary trees, representing the parent coding unit that is partitioned into two child coding units. At each level of the binary tree portion, a block can be divided symmetrically, either vertically or horizontally. A flag set to "0" indicates that the block is symmetrically split horizontally, while a flag set to "1" indicates that the block is symmetrically split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
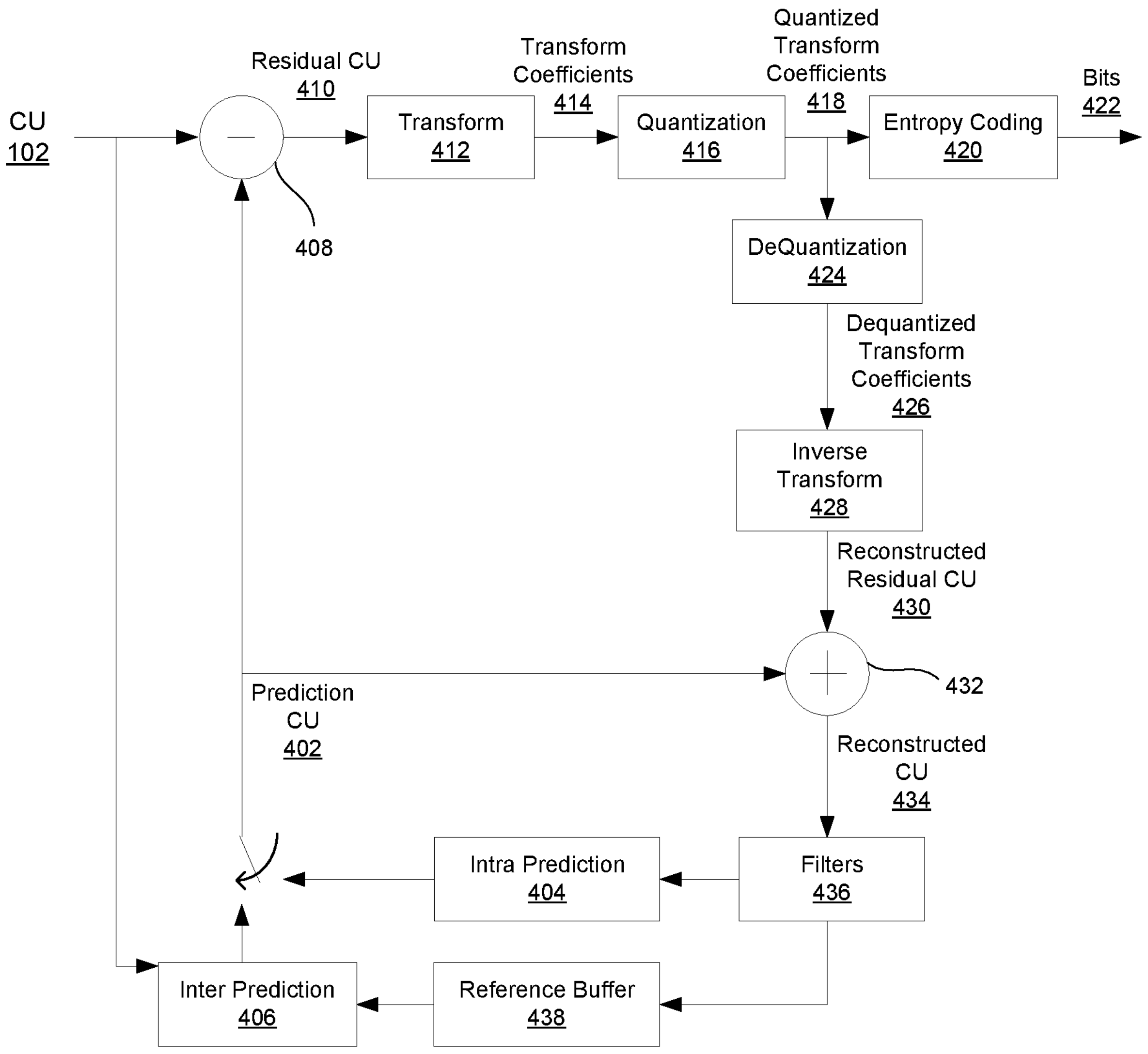
FIG. 4 depicts a simplified block diagram for CU coding in a JVET encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A sequence of coding units may make up a slice, and one or more slices may make up a picture. A slice may include one or more slice segments, each in its own NAL unit. A slice or slice segment may include header information for the slice or bitstream.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction are techniques in intra coding that can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

When coding a CU's luma component, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

In some embodiments, syntax can be coded in the bitstream that indicates the intra prediction modes used to code each CU 102. However, as described below with respect to FIGS. 7-17, in other embodiments the encoder can save overhead in the bitstream by omitting information that indicates the intra prediction mode used to encode a CU 102, and a decoder can use template matching to generate a prediction block when decoding a CU 102 encoded with intra prediction.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)16}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below. As described below with respect to FIGS. 7-17, in some embodiments the encoder can save overhead in the bitstream by omitting information from the bitstream that indicates which intra prediction modes were used to encode CUs 102, and the decoder can use template matching when decoding CUs 102 encoded with intra prediction.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434. While in some embodiments the encoder can perform intra prediction at 404 as described above, in other embodiments the encoder can follow the process described below with respect to FIGS. 7-17 for intra prediction template matching to generate a prediction CU 402 in the same way that a decoder would use template matching for intra prediction if information identifying the intra prediction mode used for the CU 102 is omitted from the bitstream.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
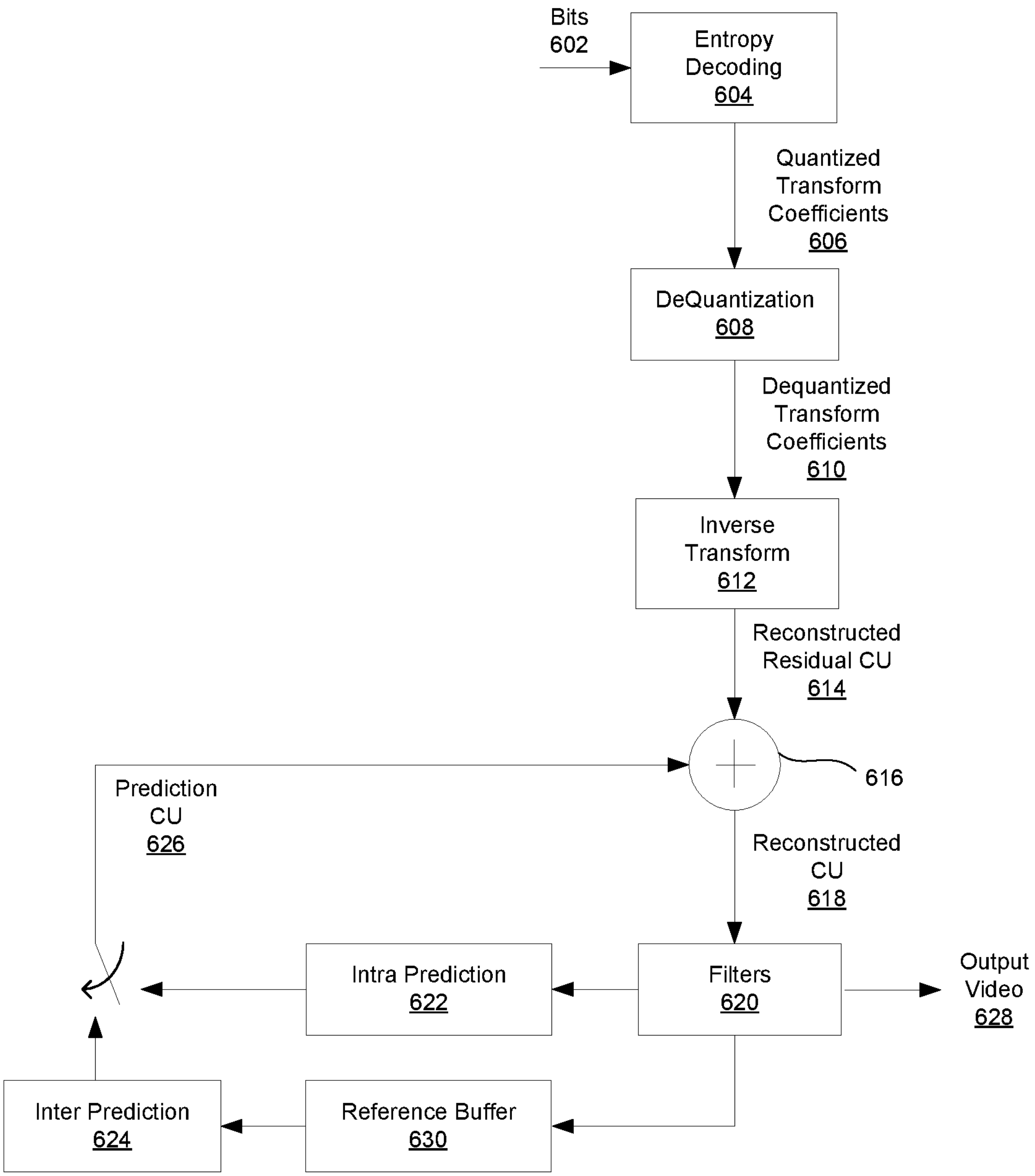
FIG. 6 depicts a simplified block diagram for CU coding in a JVET decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure. By way of a non-limiting example, the bitstream can identify how CUs 102 were partitioned from each CTU 100 in a QTBT using quadtree partitioning, symmetric binary partitioning, and/or asymmetric binary partitioning. The bitstream can also indicate prediction information for the CUs 102 such as intra prediction modes or motion vectors, and bits 602 representing entropy encoded residual CUs. In some embodiments the encoder can have omitted information in the bitstream about intra prediction modes used to encode some or all CUs 102 coded using intra prediction, and as such the decoder can use template matching for intra prediction as described below with respect to FIGS. 7-17.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618. As described below with respect to FIGS. 7-17, in some embodiments the decoder can find the prediction CU 626 using template matching for intra prediction.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

While in some embodiments the bitstream received by a JVET decoder can include syntax identifying which intra prediction mode was used to encode a CU 102 with intra prediction, such that the decoder can directly use the signaled intra prediction mode at 622 to generate a prediction CU 626, in other embodiments such syntax can be omitted to save overhead by reducing the number of bits in the bitstream. In these embodiments, when the decoder is not provided with an indication of which intra prediction mode was used to encode a CU 102, the decoder can use template matching for intra prediction at 622 to derive the intra prediction mode it should use to generate a prediction CU 626. In some embodiments an encoder can similarly use template matching for intra prediction at 404 when generating a prediction CU 402 to combine with a reconstructed residual CU 430 at 432 within its decoding loop.

Predictors may be generated in intra coding to exploit correlation between the coding block and its neighbors. As described above, intra prediction is a type of intra coding for video compression that utilizes spatial neighbors of a pixel to create a predictor, from which a prediction residual between the pixel and its predictor may be determined. A video encoder may compress the residual predicted from the predictor, resulting in the coding bitstream.

Figure 7A:
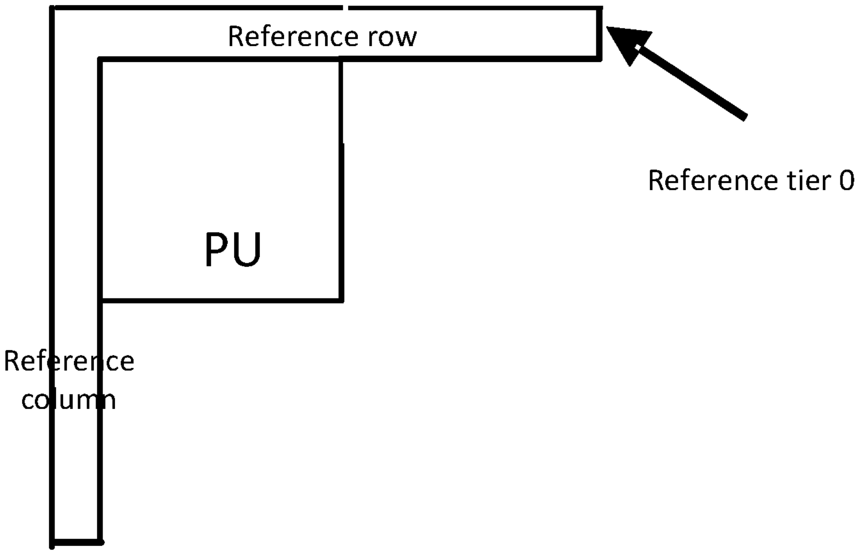
FIG. 7A depicts an HEVC method of intra prediction, where each intra prediction unit (PU) selects one intra prediction mode to be used.

FIG. 7A depicts a method of intra prediction that relies on a single reference line/tier. For angular prediction using a single reference line, each pixel in the coding block is projected to the nearest reference line along the angular direction. The reference line may be a reference row adjacent to the top boundary of the coding block or a reference column adjacent to the left boundary of the coding block. In certain embodiments, either the reference row or reference column is used in the predictor generation process, but not both. In certain embodiments, some angular modes do generate a predictor of a coding block using both a top and left neighbor, but using only one side neighbor in a predictor generation process of a pixel. Thus in an example with HEVC's 35 nodes projected neighbors along reference column may serve as reference line for each of horizontal modes (modes 2-17) and projected neighbors along reference row may serve as the reference line for each of vertical modes (modes 19-34).

Figure 7B:
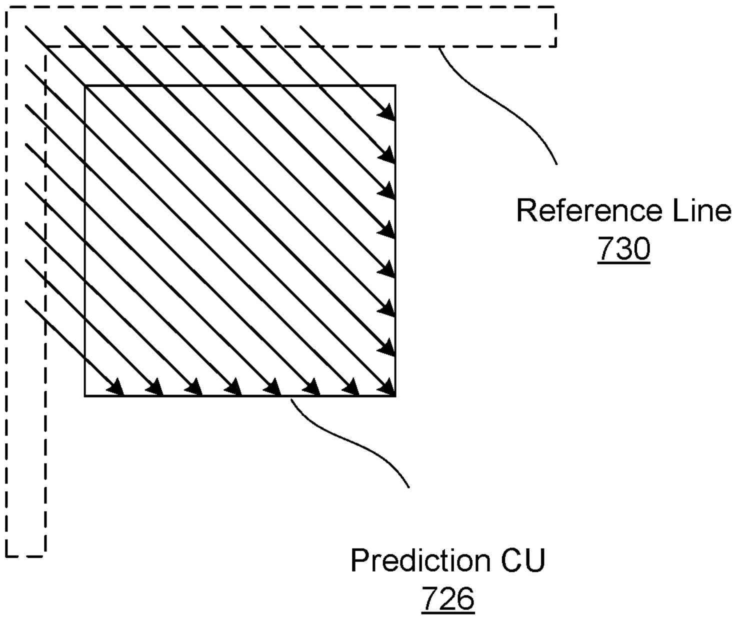
FIG. 7B depicts a prediction CU being generated from pixels in reference line.

By way of a non-limiting example, FIG. 7B depicts a prediction CU 726 being generated from pixels in reference line 730. Since pixels with a shorter distance will often have a stronger correlation in a picture, the use of only the nearest reference line to predict a current block is reasonably employed in HEVC. For each intra prediction mode, a projected neighbor position along the single reference line for each pixel within a coding unit may be determined using the angular direction associated with intra mode, and in one or more embodiments only one reference line adjacent to a current coding block is used to predict samples inside the block. Thus, in HEVC, for example, which allows 35 possible intra prediction modes, each intra prediction unit (PU) selects one intra prediction mode to be used, and the projected neighbors along reference column may serve as the reference line for horizontal modes (modes 2-17) and projected neighbors along reference row may serve as the reference line for vertical modes (modes 19-34).

Figure 7C:
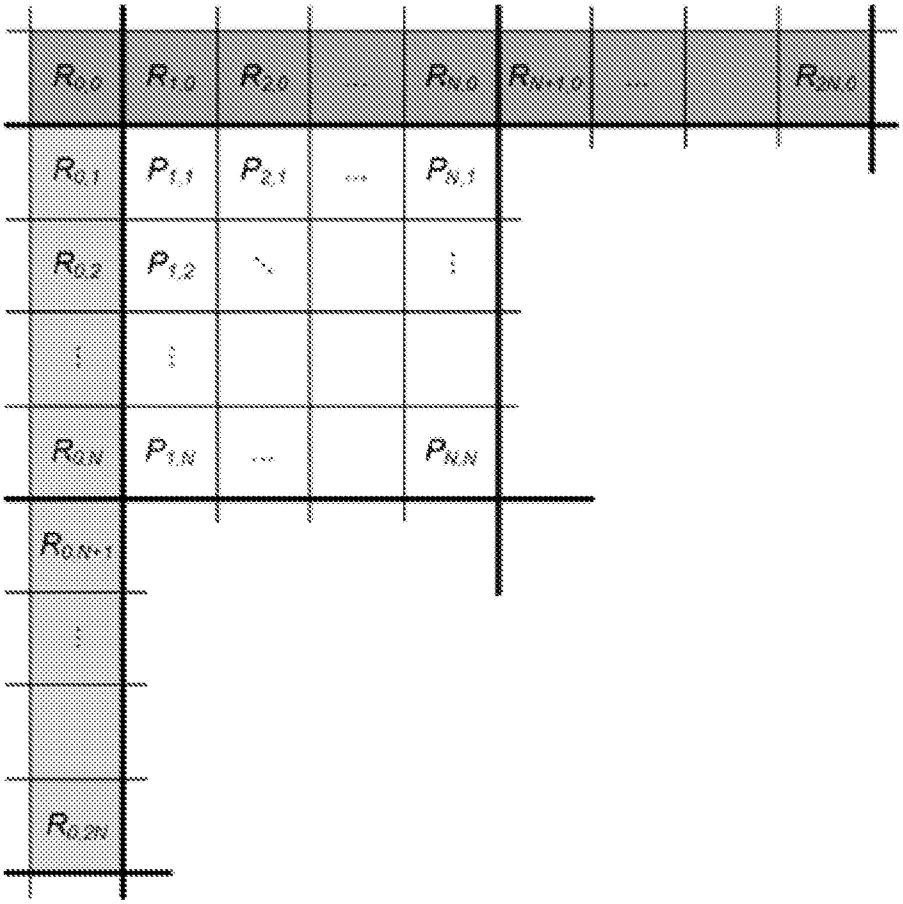
FIG. 7C illustrates the use of reference samples Rx, in prediction to obtain predicted samples Px,y for a block of size N×N samples.

Angular prediction is a copying-based process which assumes visual content follows a pure direction of propagation. As shown in FIG. 7C, all prediction modes in such scenario utilizes a same basic set of reference samples from above and to the left of the image block to be predicted. In FIG. 7C, reference samples are denoted Rx,y with (x,y) having its origin one pixel above and to the left of the block's top left corner, and Px,y denotes a predicted sample value at position (x,y). Thus, each of reference samples Rx,y is used in prediction to obtain predicted samples Px,y for a block of size N×N samples.

However, as recognized herein, relying on only the nearest reference line does not always generate the best predictor. For example, angular prediction using a prediction generation process that relies on only one side of the neighbors may suffer from blocking artifacts. If noise is introduced during video coding, for example, the nearest reference line may be corrupted by noise, such noise propagating into the prediction. Relying on only one side of the neighbors may cause strong discontinuity between a boundary pixel and a neighbor pixel of the side that is not used in the prediction generation process. In some cases, the neighboring reference samples may be unavailable for intra prediction, such as at picture or slice boundaries, and thus replacement reference samples are generated by repetition from closest available samples. Further, relying on a single reference line based method may also result in incoherence caused by signal noise or the texture of the other object, and the nearest reference line may have a worse reconstruction quality in block-based video coding (e.g., in many block-based video coding frameworks, pixels in different positions of a block have different reconstruction quality).

In HEVC implementations, each intra prediction mode for generating a prediction pixel may have a unique prediction generation method based on either a left-side neighbor (reference column) or top-size neighbor (reference row). Thus, referring to FIGS. 7A and 7B, of each intra prediction mode has a unique prediction generation method based on either a left-side neighbor or top-size neighbor from either a reference row or reference column in Reference Tier 0. Each intra prediction mode used for each intra prediction unit must be signaled as overhead in the coding bitstream.

Disclosed herein are techniques for increasing the number of possible reference tiers available for intra prediction. Also disclosed is the use of both side neighbors to generate a predicting pixel. In other words, besides the nearest reference line, further reference lines may be utilized for intra prediction of a coding unit. And both side neighbors, two neighbors on a reference row and/or reference column, may be use from a single or multiple reference lines.

By increasing the number of possible reference tiers available for intra prediction, from one reference to N reference tiers (N is larger than 1), the disclosed techniques may improve encoder speed and/or efficiency. For example, the diversity employed in the prediction process by forming predictor block based on one of many possible reference lines, instead of just the adjacent reference line, may improve the predictive power of intra prediction process, such as where a reference line with less noise is used, Thus, in one or more embodiments where one or more reference tiers are available, the intra sample prediction process may be performed by extrapolating sample values from reconstructed reference samples, where sample locations within one coding block are projected onto one or more reference lines depending on the directionality of the selected prediction mode.

In one or more embodiments, the intra direction mode determines which reference line, e.g., within which tier, is selected to generate intra predictors. Instead of using reconstructed samples from a corresponding neighboring block, an index coded in the bitstream may signal to the decoder to indicate which reference tier is chosen for an intra directional mode.

In one or more embodiments, a best reference line or lines can be chosen from a plurality of reference lines according to a sum of absolute transformed differences between the predict block and the original block, where each reference line will check all of the angular directions.

Figure 5:
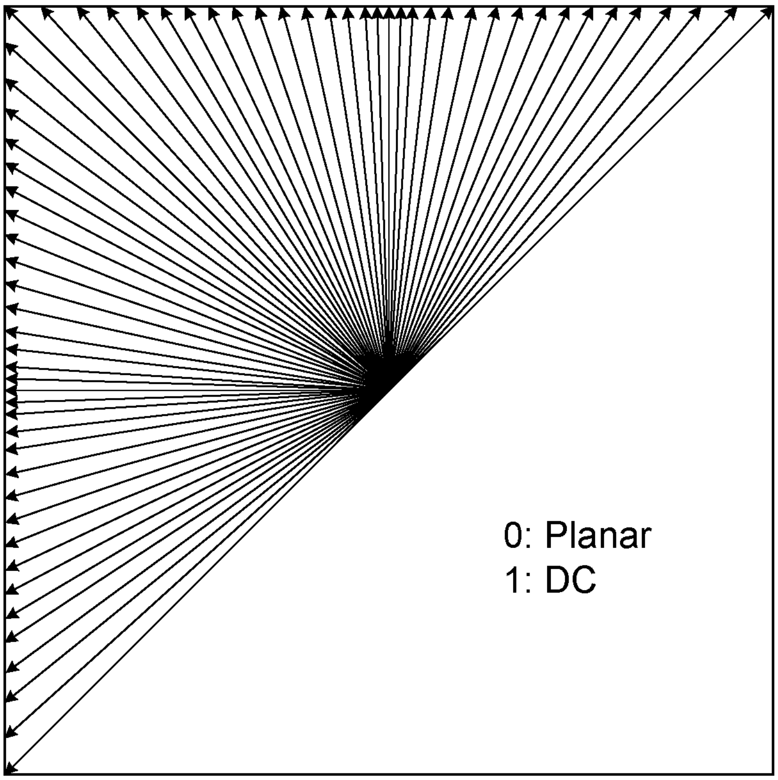
FIG. 5 depicts possible intra prediction modes for luma components in JVET.

In contrast to HEVC, the number of directional modes increases for JVET. As illustrated in FIG. 5, the JVET compression tools for intra prediction include 67 intra prediction modes (planar, DC, and 65 intra, or angular, directional modes), adding 32 additional angular modes to improve coding performance. Thus, not only are there an increase in the number of mode directions, disclosed are techniques for combining an increased number of nodes with an increased number of reference lines.

Figure 8:
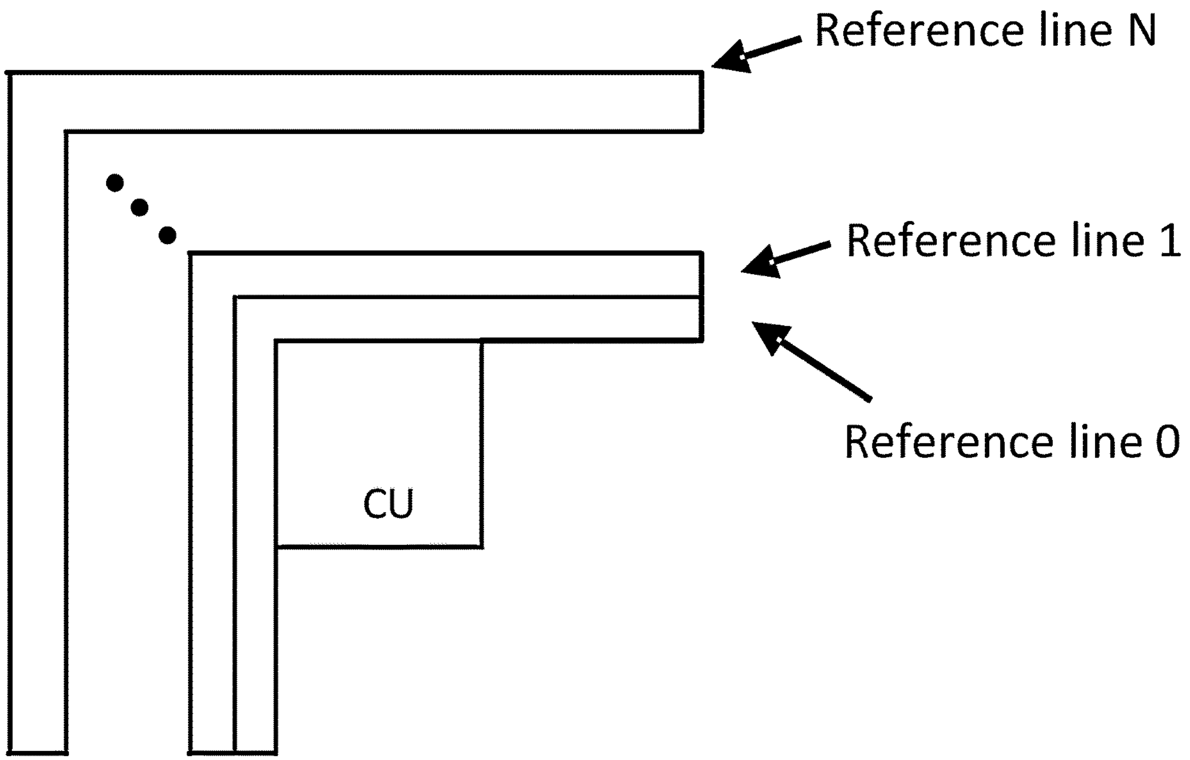
FIG. 8 depicts an example of multiple line-based intra prediction for JVET intra prediction modes.

FIG. 8 depicts an example of multiple line-based intra prediction for JVET intra prediction modes, where intra prediction may generate predictors from multiple reference tiers for intra directional modes, such as generating a predictor based on neighbors from both the reference row adjacent to the top and the reference column adjacent to the side, or from reference rows and/or columns in reference tiers that are not adjacent to the coding unit.

A predicted sample P[x,y] may be obtained by projecting its location to a selected reference row of pixels by applying a selected prediction direction and interpolating a value for the sample. Interpolation may be performed linearly using the two closest reference samples from the selected reference line.

As described in more detail below, the techniques disclosed herein may be extended to multiple reference lines to support multiple line-based intra prediction by properly adjusting a distance between the predictor position and projected position. A reference line may include at least one of a reference row, a reference column, or a combination of a reference row and reference column. To make the combination approach more flexible, more than one reference line indicator can be used. For example, where two reference lines are used, one reference line may indicate the main reference line and a second reference line may indicate the side reference line. A reference column or row that is partially used in predictor generation may be called a side reference line.

In one or more embodiments, predictor pixels for angular prediction are generated using pixels at projected position on both a top reference row and left reference column. Predictor generation can be done in three steps. First, a coding system may project a pixel position along a main reference line according to an angular direction definition of the coding intra prediction mode. The pixel value(s) of the projected position may be computed using linear interpolation between two neighboring reconstructed pixels. Second, the coding system may project pixel position(s) along the side reference line according to the angular definition of the same coding mode. The pixel value(s) of the projected position may be computed using linear interpolation between two neighboring reconstructed pixels. Third, the projected pixel value(s) on the main reference line may be combined with the projected pixel value(s) on the side reference. One example for combination, as shown in Equation (1), is to weight the values according to distance between the predictor pixels and projected pixel positions on the main and side references.

$$P[x,y]=(((w1*\text{MainRecon}[x',y'])+(w2*\text{SideRecon}[x'',y''])+(w1+w2)/2)/(w1+w2)) \quad (1)$$

Where:

w(n) is a weighting between two reference samples corresponding to a projected subpixel location between $R_{i,0}$ and $R_{i+1,0}$ Reference sample index I and weighted parameter w are calculated based on a projection displacement associated with a selected prediction direction.

MainRecon[x',y'] is a pixel value of neighbor at projected position (x',y'), corresponding to the predicting pixel (x,y), along the main reference.

SideRecon[x',y'] is a pixel value of neighbor at projected position (x",y"), corresponding to the predicting pixel (x,y), along the side reference.

For each angular mode, a corresponding weighted angular mode may be used which applies a weight to the predicted samples on the reference row and reference column when computing the predictor pixel P[x,y] at coordinate x,y. Two different weighted values may apply, and S[n] illustrates an array of weight parameters. Thus, in one or more embodiments, the weighted prediction method is used for the predictor pixel in the coding block instead of the regular, non-weighted calculation for the predictor pixel, and the weighted prediction method may be used for one or more of the intra prediction angular modes.

As described herein, JVET introduces additional intra prediction modes that expand upon the 33 modes in HEVC. Consider an example in which there are 67 total modes, 65 of which are angular modes, as shown in FIG. 5. Thus, where 0 is the planar mode, 1 is the DC planar mode, assume the 65 angular modes are modes 2-66 (i.e., 65 angular modes). A specific example of the disclosed techniques is now described using JVET mode 2 and mode 66, but it should be understood that the ideas disclosed for weighted angular prediction may cover one or more of the JVET angular modes. Further it should be understood that there may be more than 67 intra prediction modes.

For the JVET mode 2 or mode 66 example, predictor pixel at coordinate (x,y), P [x,y], is calculated as described in Equation (2), with the weights assigned as shown:

$$P[x,y]=((((x+1)*\text{Recon}[x+y+2,-1])+((y+1)*(\text{Recon}[-1,x+y+2]))+(y+x+2)/2)/(y+x+2)) \quad (2)$$

Where:

Recon[0,0] is a reconstructed pixel at top left coordinate (0,0) of the current PU.

An exception to weighted angular prediction may occur when a projected reference position on the side reference refers to a reconstructed position that is not available. There are several ways to handle the exception; e.g., use value of last available reconstructed pixel or default value for that projected position, or disable weighted angular prediction and use projected pixel position on the main reference only.

Equation (2) above involves division operations, which can be costly in terms of complexity. As proposed below in equation (3), the division operations can be roughly converted into scale operations to make them implementation friendly, thus introducing the disclosed weighted angular prediction implementation.

$$P[x,y]=((((x+1)*\text{Recon}[x+y+2,-1])+((y+1)*\text{Recon}[-1,x+y+2])*S[y+x+2]+(y+x+2)/2)>>\text{ShiftDenom}) \quad (3)$$

Where:

S[n] is a weight of parameter n, and

>> denotes a bit shift operation to the right

ShiftDenom is a factor for shifted down operation. In embodiments, S[n] may be the same weighting table used in UW-Planar implementations.

Specifically, S[n] may be an approximation of a factor 1/n, and can be described as shown in equation (4).

$$S[n] = \text{Round}\left(\frac{(1 \ll ShiftDenom)}{n}\right) \quad (4)$$

FIG. 9 is an example of S[n], where sum of width and height is 256 and ShiftDenom=10.

FIG. 10 illustrates another example of S[n], where the sum of the width and height is 512 and ShiftDenom=10.

The use of additional reference lines that are further from the coding unit than the reference line that is adjacent may increase prediction. As shown in FIG. 8, the intra directional mode for the coding unit could choose one or more of N reference tiers to generate the predictors. As described in more detail below, the predictor p[x,y] may be generated from one of a plurality of reference samples within each reference line.

Overhead bit(s) may signal in the bitstream which reference line is to be used for intra predictor generation. For example, a syntax element, such as a flag, may signal which reference tier is chosen for an intra directional mode. Overhead bit(s) may also signal in the bitstream which reference line is to be used for intra predictor generation. In one or more embodiments, two overhead bits may be used, one to indicate a reference line index for the main reference, and another to indicate the side reference line.

Under some circumstances, the shift conversion used in Equation (3) does not provide accurate outputs resulting in poor coding efficiency. The ineffectiveness is due to a conversion process which allows error to accumulate linearly with distance. In one or more embodiments, the error is reduced by exploiting the fact that weight for horizontal and vertical predictors are complimentary in (3) and hence the real weight can be computed based on that of horizontal or vertical predictor, whichever is more accurate. An example of this approach is now described.

In an example of the disclosed techniques, parameters horWeight and verWeight are introduced and (3) can now be described as (5).

$$P[x, y] = (((horWeight * Recon[x + y + 2, -1]) + (verWeight * Recon[-1, x + y + 2]) + (y + x + 2)/2) \gg ShiftDenom) \quad (5)$$

$$horWeight = \begin{cases} (1 \ll ShiftDenom) - verWeight & \text{when } x < y \\ (y + 1) * S[x + y + 2] & \text{otherwise} \end{cases} \quad (6)$$

$$verWeight = \begin{cases} (x + 1) * S[x + y + 2] & \text{when } x < y \\ 1 \ll ShiftDenom) - horWeight & \text{otherwise} \end{cases} \quad (7)$$

In one or more embodiments for a weighted angular prediction, the resulting weighted angular prediction mode may or may not replace the original angular mode. As an example, new weighted angular mode 2, or 66 may replace original mode 2, or 66. In one or more embodiments, both weighted angular mode and original angular mode are retained. Disclosed herein are techniques for coding added weighted angular modes. Thus, in one or more embodiments, one or more non-weighted angular modes has a corresponding weighted angular mode, and both the non-weighted and weighted modes are available.

As disclosed herein, both weighted angular mode and original angular mode for intra code are retained. In JVET, there are 65 angular modes. Thus, for each angular mode, except horizontal and vertical modes, there may be a corresponding weighted angular mode for intra code.

Assume for purposes of example, that JVET only adds one additional mode, which is a weighted mode corresponding to just one JVET non-weighted angular mode. Thus, in the example where JVET has 67 non-weighted intra-prediction modes, 65 of them angular, the added weighted angular mode increases the number of modes available to 68 modes. It is noted that each non-weighted angular mode may have a corresponding weighted mode.

In one or more embodiments, a coded syntax may indicate which intra prediction mode should be used when generating the predictor for a predicted pixel. As described above, a weighted JVET angular mode may be produced for each non-weighted, regular JVET angular mode. Thus, during coding, the encoder or decoder may need to make a decision regarding whether to use the non-weighted or weighted angular mode to generate a predictor. Where both a non-weighted and weighted angular mode are available for coding, that means additional processing to determine which mode to use to generate a predictor.

In one or more embodiments, a syntax element is coded to indicate whether a weighted or non-weighted mode is used in the prediction, the syntax indicating whether or not a weighted version of an angular mode exists or is available and whether it is used for prediction. In an example embodiment, in order to code each of the additional weighted angular modes, a flag may signal a distinction between original angular mode and its corresponding weighted angular mode. Such flag may assist on angular mode selection during intra coding. In embodiments, the flag, e.g., a weighted_angular_mode flag, may be used to distinguish original angular mode or its corresponding weighted angular mode. A possible syntax arrangement is proposed as follows.

```
decode intra_mode with current JVET method
if (intra_mode==DC/Planar)
    generation_DC/Planar_prediction
else
    decode weighted_angular_mode
if(weighted_angular_mode)
    generate weighted_angular_prediction
else
    generate original angular_prediction
```

Thus, the coded syntax may indicate whether to use a weighted or non-weighted angular mode without a distinction or a need to code whether a weighted mode is even available. For example, assume only 3 modes have a corresponding weighted mode. For any other modes used in prediction, the syntax will indicate that the non-weighted mode is to be used for prediction (because a non-weighted corresponding mode is unavailable). Thus, coding the bitstream may not need further processing to indicate whether a weighted mode is available, the coding simply operates according to the flag, and may be agnostic to which corresponding weighted modes are available for which modes. Thus, in one or more embodiments where both a non-weighted and a weighted angular mode are available, the coding process may choose between non-weighted and weighted for a single mode.

With the above syntax, most probable mode (MPM) coding may remain unchanged. But, in one or more embodiments, the additional flag bin, weighted_angular_mode, may be required. The weighted_angular_mode flag may be a one bit flag that identifies whether a corresponding weighted angular mode exists (e.g., 1=True (weighted angular mode present, 0=False (weighted angular mode not present). In one or more embodiments, the value of the weighted_angular_mode flag may identify a particular angular mode, which may be implemented with multiple bits.

Practically, it may not be necessary to have the corresponding weighted angular mode for each angular mode due to the coding performance and complexity. Thus, in one or more embodiments, only a limited number of original angular modes have a corresponding weighted angular modes as a new intra modes. For example, the original angular mode 66 may be the only angular mode allowed to have its weighted angular mode. In such example, the result is DC, Planar, 65 original angular modes, plus one weighted angular mode, which includes the original angular modes 66 (for a total of 68 modes for luma block). The weighted angular mode may be treated as mode 67. It should be understood that if more original angular modes are allowed to have a corresponding weighted angular mode, the result will be to have additional modes.

There are at least two ways to code the weighted angular modes (such as mode 67 in the example above). For example, in one or more embodiments, mode 67 may be treated as a regular mode and is included in the MPM list as one of default modes. In one or more embodiments, mode 67 is not included as one of default modes for MPM unless or until it is used by one of the neighboring blocks.

Figure 11:
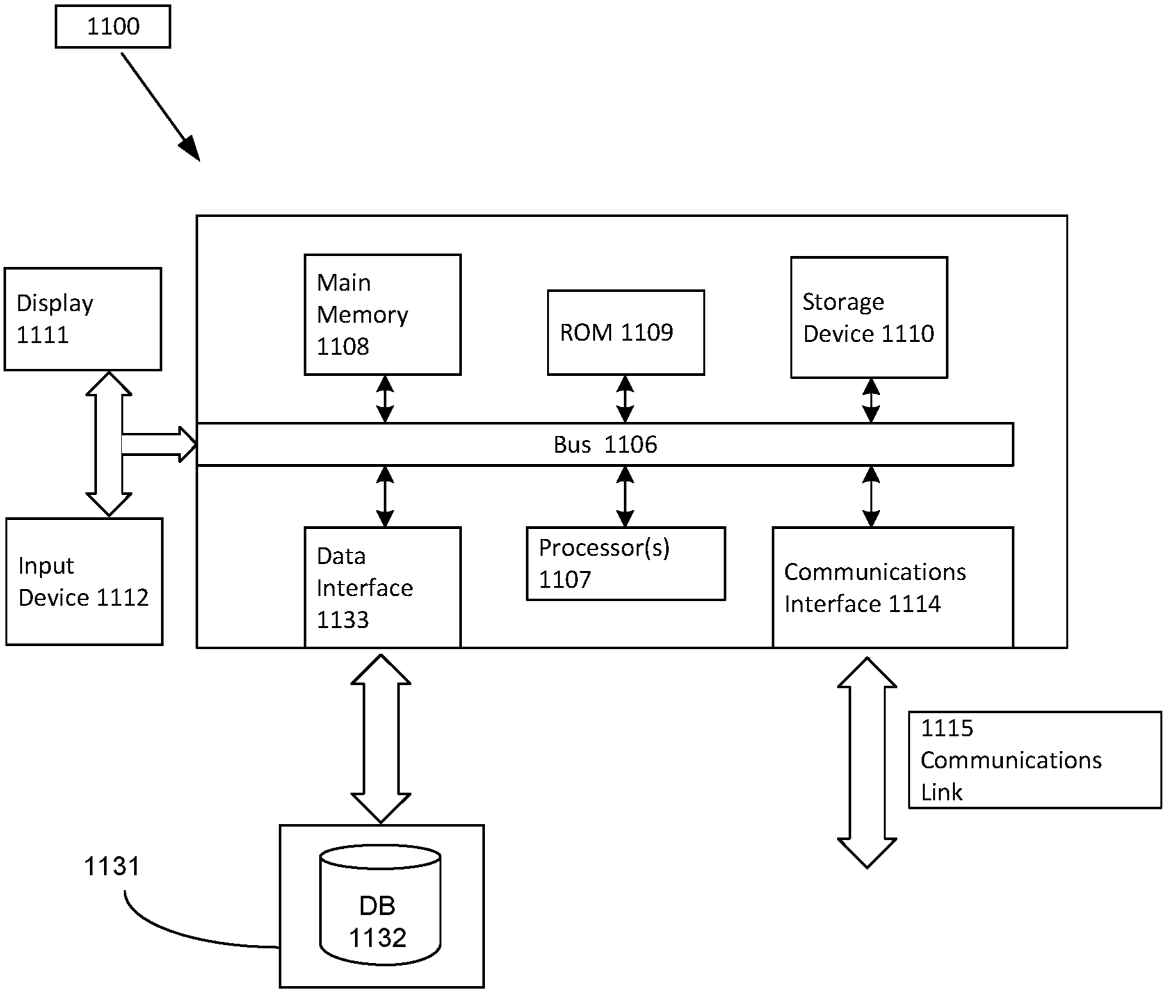
FIG. 11 depicts an embodiment of a computer system adapted and/or configured to process a method of CU coding.

The execution of the sequences of instructions required to practice the embodiments can be performed by a computer system 1100 as shown in FIG. 11. In an embodiment, execution of the sequences of instructions is performed by a single computer system 1100. According to other embodiments, two or more computer systems 1100 coupled by a communication link 1115 can perform the sequence of instructions in coordination with one another. Although a description of only one computer system 1100 will be presented below, however, it should be understood that any number of computer systems 1100 can be employed to practice the embodiments.

A computer system 1100 according to an embodiment will now be described with reference to FIG. 11, which is a block diagram of the functional components of a computer system 1100. As used herein, the term computer system 1100 is broadly used to describe any computing device that can store and independently run one or more programs.

Each computer system 1100 can include a communication interface 1114 coupled to the bus 1106. The communication interface 1114 provides two-way communication between computer systems 1100. The communication interface 1114 of a respective computer system 1100 transmits and receives electrical, electromagnetic or optical signals, which include data streams representing various types of signal information, e.g., instructions, messages and data. A communication link 1115 links one computer system 1100 with another computer system 1100. For example, the communication link 1115 can be a LAN, in which case the communication interface 1114 can be a LAN card, or the communication link 1115 can be a PSTN, in which case the communication interface 1114 can be an integrated services digital network (ISDN) card or a modem, or the communication link 1115 can be the Internet, in which case the communication interface 1114 can be a dial-up, cable or wireless modem.

A computer system 1100 can transmit and receive messages, data, and instructions, including program, i.e., application, code, through its respective communication link 1115 and communication interface 1114. Received program code can be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, which include data streams representing various types of signal information, e.g., instructions, messages and data. In embodiments, the functions of the data interface 1133 can be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be executed by the processor(s) 1107. The main memory 1108 also can be used for storing temporary data, i.e., variables, or other intermediate information during execution of instructions by the processor(s) 1107.

The computer system 1100 can further include a read only memory (ROM) 1109 or other static storage device coupled to the bus 1106 for storing static data and instructions for the processor(s) 1107. A storage device 1110, such as a magnetic disk or optical disk, can also be provided and coupled to the bus 1106 for storing data and instructions for the processor(s) 1107.

A computer system 1100 can be coupled via the bus 1106 to a display device 1111, such as, but not limited to, a cathode ray tube (CRT) or a liquid-crystal display (LCD) monitor, for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions can be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1107. Such a medium can take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that cannot retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 12:
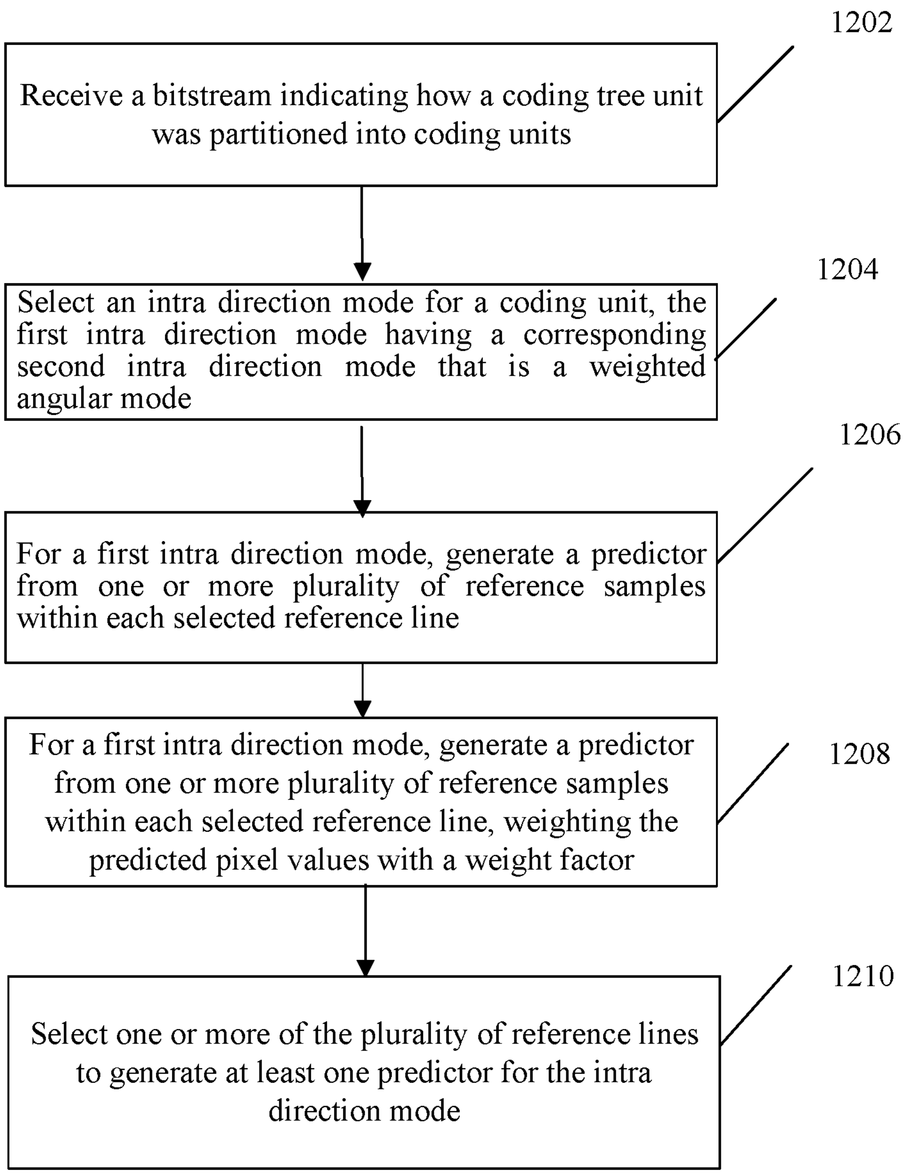
FIG. 12 is a flow diagram that illustrates a method for performing the disclosed techniques.

FIG. 12 is a flow diagram that illustrates a method for performing the disclosed techniques, but it should be understood that the techniques described herein with respect to the remaining figures similarly capture the methods available using the disclosed techniques. As illustrated in FIG. 12, a JVET encoder or decoder, such as those described in FIGS. 7, 9, and 13, may receive a bitstream at 1202 indicating how a coding tree unit was partitioned in to coding units, such as a bitstream with a syntax structure as described with respect to FIG. 3. At 1210, the encoder or decoder may select an intra direction for a coding unit, such as described with respect to FIG. 5, where a first intra direction mode may have a corresponding second intra direction mode that is weighted. At 1206, the encoder or decoder may generate a predictor for a first intra direction mode and at 1208 the encoder or decoder may generate a predictor for the second intra direction mode, with a weighting factor applied to the predicted pixels. At 1210, the coding unit may be coded with a selected first and/or second intra direction mode.

Figure 13:
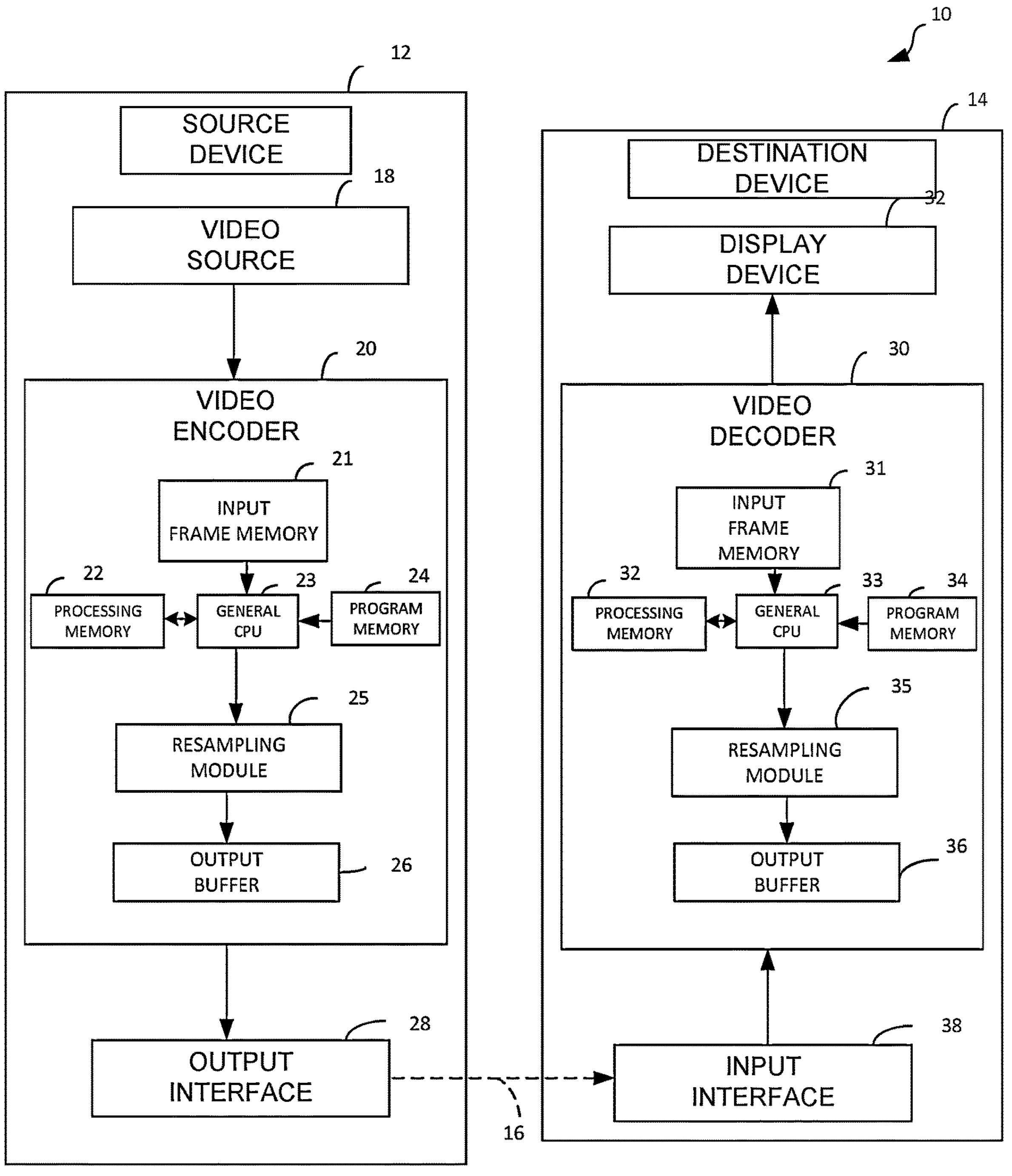
FIG. 13 is a high level view of a source device and destination device that may incorporate features of the systems and devices described herein.

FIG. 13 is a high level view of a source device 12 and destination device 10 that may incorporate features of the systems and devices described herein. As shown in FIG. 13, example video coding system 10 includes a source device 12 and a destination device 14 where, in this example, the source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 13, source device 12 includes a video source 18, video encoder 20, and an output interface 22. In some cases, output interface 28 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. An input image may be received by the video encoder 20 and stored in the input frame memory 21. The general purpose processor 23 may load information from here and perform encoding. The program for driving the general purpose processor may be loaded from a storage device, such as the example memory modules depicted in FIG. 13. The general purpose processor may use processing memory 22 to perform the encoding, and the output of the encoding information by the general processor may be stored in a buffer, such as output buffer 26.

The video encoder 20 may include a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters.

The encoded video data, e.g., a coded bit stream, may be transmitted directly to destination device 14 via output interface 28 of source device 12. In the example of FIG. 13, destination device 14 includes an input interface 38, a video decoder 30, and a display device 32. In some cases, input interface 28 may include a receiver and/or a modem. Input interface 38 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

The encoded video data may also be stored onto a storage medium or a file server for later access by destination device 14 for decoding and/or playback. For example, the coded bitstream may be temporarily stored in the input buffer 31, then loaded in to the general purpose processor 33. The program for driving the general purpose processor may be loaded from a storage device or memory. The general purpose processor may use a process memory 32 to perform the decoding. The video decoder 30 may also include a resampling module 35 similar to the resampling module 25 employed in the video encoder 20.

FIG. 13 depicts the resampling module 35 separately from the general purpose processor 33, but it would be appreciated by one of skill in the art that the resampling function may be performed by a program executed by the general purpose processor, and the processing in the video encoder may be accomplished using one or more processors. The decoded image(s) may be stored in the output frame buffer 36 and then sent out to the input interface 38.

Display device 38 may be integrated with or may be external to destination device 14. In some examples, destination device 14 may include an integrated display device and may also be configured to interface with an external display device. In other examples, destination device 14 may be a display device. In general, display device 38 displays the decoded video data to a user.

Video encoder 20 and video decoder 30 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 20 and video decoder 30 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 23 and 33 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 23 and 33.

A storage device may also store instructions, instructions, such as source code or binary code, for performing the techniques described above. A storage device may additionally store data used and manipulated by the computer processor. For example, a storage device in a video encoder 20 or a video decoder 30 may be a database that is accessed by computer system 23 or 33. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a" "an", and "the" includes plural references unless the context clearly dictates otherwise. Also, as used in the description herein and throughout the claims that follow, the meaning of "in" includes "in" and "on" unless the context clearly dictates otherwise.

Although the subject matter has been described in language specific to structural features and/or methodological acts, it is to be understood that the subject matter defined in the appended claims is not necessarily limited to the specific features or acts described above.

Although embodiments have been disclosed herein in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

We claim:

1. An apparatus for decoding video data comprising one or more processors configured to:

(a) receive a bitstream indicating how a coding tree unit was partitioned into a plurality of coding units according to a partitioning structure that allows nodes to be split according to a partitioning technique, where at least one of said coding units is rectangular, where said bitstream includes at least one B-slice, said partitioning structure includes a square parent block is split with quadtree partitioning that splits the square parent node in half in both horizontal and vertical directions to define four blocks as leaf nodes that are square in shape each of which are the same size, where said partitioning technique allows nodes to be partitioned with binary partitioning, wherein a node is recursively partitionable using said binary partitioning, where at least one of said binary partitioning results in a rectangular node, where said binary partitioning allows nodes to be split in a horizontal direction, where said binary partitioning allows nodes to be split in a vertical direction, wherein a node as a result of said binary partitioning is allowed to be split in a horizontal direction, wherein a node as a result of said binary partitioning is allowed to be split in a vertical direction;

(b) parse said bitstream to identify at least one syntax element indicating an angular direction for an intra angular directional mode based upon one of 65 directions to use for generating at least one predictor for respective ones of said plurality of coding units, where said at least one predictor determines predicted samples;

(c) wherein said intra angular directional mode for a first one of said coding units comprises a weighted said intra angular directional mode, where said weighted said intra angular directional mode for said generating said at least one predictor is based upon a pixel value on at least one of said top row and said left column of said respective said coding unit along said angular direction;

(d) wherein said intra angular directional mode for a second one of said coding units comprises a non-weighted said intra angular directional mode for said generating said at least one predictor, where said weighted said intra angular directional mode and said non-weighted said intra angular directional mode are not both selected for any of said at least one predictor for any particular said coding unit, where said non-weighted said intra angular directional mode for said generating said at least one predictor is based upon a pixel value on at least one of a top row or a left column of said respective said coding unit along said angular direction;

(e) identify based upon said at least one syntax element whether to use said weighted said intra angular directional mode or said non-weighted said intra angular directional mode to generate said at least one predictor for said respective said coding unit;

(f) generate said at least one predictor using said intra angular directional mode for said first one of said coding units and generate said at least one predictor using said intra angular directional mode for said second one of said coding units; and (g) decoding said first one of said coding units in accordance with respective said at least one predictor and decoding said second one of said coding units in accordance with respective said at least one predictor.

2. An apparatus for encoding video data comprising one or more processors configured to:

(a) provide a bitstream indicating how a coding tree unit was partitioned into a plurality of coding units according to a partitioning structure that allows nodes to be split according to a partitioning technique, where at least one of said coding units is rectangular, where said bitstream includes at least one B-slice, said partitioning structure includes a square parent block is split with quadtree partitioning that splits the square parent node in half in both horizontal and vertical directions to define four blocks as leaf nodes that are square in shape each of which are the same size, where said partitioning technique allows nodes to be partitioned with binary partitioning, wherein a node is recursively partitionable using said binary partitioning, where at least one of said binary partitioning results in a rectangular node, where said binary partitioning allows nodes to be split in a horizontal direction, where said binary partitioning allows nodes to be split in a vertical direction, wherein a node as a result of said binary partitioning is allowed to be split in a horizontal direction, wherein a node as a result of said binary partitioning is allowed to be split in a vertical direction;

(b) wherein said bitstream is configured for parsing said bitstream to identify at least one syntax element indicating an angular direction for an intra angular directional mode based upon one of 65 directions to use for generating at least one predictor for respective ones of said plurality of coding units, where said at least one predictor determines predicted samples;

(c) wherein said intra angular directional mode for a first one of said coding units comprises a weighted said intra angular directional mode, where said weighted said intra angular directional mode for said generating said at least one predictor is based upon a pixel value on at least one of said top row and said left column of said respective said coding unit along said angular direction;

(d) wherein said intra angular directional mode for a second one of said coding units comprises a non-weighted said intra angular directional mode for said generating said at least one predictor, where said weighted said intra angular directional mode and said non-weighted said intra angular directional mode are not both selected for any of said at least one predictor for any particular said coding unit, where said non-weighted said intra angular directional mode for said generating said at least one predictor is based upon a pixel value on at least one of a top row or a left column of said respective said coding unit along said angular direction;

(e) wherein said bitstream is configured for identifying based upon said at least one syntax element whether to use said weighted said intra angular directional mode or said non-weighted said intra angular directional mode to generate said at least one predictor for said respective said coding unit;

(f) wherein said bitstream is configured for generating said at least one predictor using said intra angular directional mode for said first one of said coding units and generate said at least one predictor using said intra angular directional mode for said second one of said coding units; and (g) encoding said first one of said coding units in accordance with respective said at least one predictor and encoding said second one of said coding units in accordance with respective said at least one predictor.

3. A method of storing a bitstream of video into a computer-readable memory/storage, wherein the bitstream containing encoded data for a block of video data is generated by a method performed by a video processing apparatus, wherein the method comprising:

(a) said bitstream containing data indicating how a coding tree unit was partitioned into a plurality of coding units according to a partitioning structure that allows nodes to be split according to a partitioning technique, where at least one of said coding units is rectangular, where said bitstream includes at least one B-slice, said partitioning structure includes a square parent block is split with quadtree partitioning that splits the square parent node in half in both horizontal and vertical directions to define four blocks as leaf nodes that are square in shape each of which are the same size, where said partitioning technique allows nodes to be partitioned with binary partitioning, wherein a node is recursively partitionable using said binary partitioning, where at least one of said binary partitioning results in a rectangular node, where said binary partitioning allows nodes to be split in a horizontal direction, where said binary partitioning allows nodes to be split in a vertical direction, wherein a node as a result of said binary partitioning is allowed to be split in a horizontal direction, wherein a node as a result of said binary partitioning is allowed to be split in a vertical direction;

(b) wherein said bitstream is configured by said video processing apparatus for parsing said bitstream to identify at least one syntax element indicating an angular direction for an intra angular directional mode based upon one of 65 directions to use for generating at least one predictor for respective ones of said plurality of coding units, where said at least one predictor determines predicted samples;

(c) wherein said intra angular directional mode for a first one of said coding units comprises a weighted said intra angular directional mode, where said weighted said intra angular directional mode for said generating said at least one predictor is based upon a pixel value on at least one of said top row and said left column of said respective said coding unit along said angular direction;

(d) wherein said intra angular directional mode for a second one of said coding units comprises a non-weighted said intra angular directional mode for said generating said at least one predictor, where said weighted said intra angular directional mode and said non-weighted said intra angular directional mode are not both selected for any of said at least one predictor for any particular said coding unit, where said non-weighted said intra angular directional mode for said generating said at least one predictor is based upon a pixel value on at least one of a top row or a left column of said respective said coding unit along said angular direction;

(e) wherein said bitstream is configured by said video processing apparatus for identifying based upon said at least one syntax element whether to use said weighted said intra angular directional mode or said non-weighted said intra angular directional mode to generate said at least one predictor for said respective said coding unit;

(f) wherein said bitstream is configured by said video processing apparatus for generating said at least one predictor using said intra angular directional mode for said first one of said coding units and generate said at least one predictor using said intra angular directional mode for said second one of said coding units; and (g) wherein said bitstream is configured by said video processing apparatus for decoding said first one of said coding units in accordance with respective said at least one predictor and wherein said bitstream is configured for decoding said second one of said coding units in accordance with respective said at least one predictor.

* * * * *